US012726578B2

(12) United States Patent
Esumi

(10) Patent No.: US 12,726,578 B2
(45) Date of Patent: Sep. 1, 2026

(54) IMAGE READING DEVICE, ADJUSTMENT METHOD AND NON-TRANSITORY COMPUTER-READABLE RECORDING MEDIUM ENCODED WITH ADJUSTMENT PROGRAM

(71) Applicant: Konica Minolta, Inc., Tokyo (JP)

(72) Inventor: Yoshihiro Esumi, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 346 days.

(21) Appl. No.: 18/650,209

(22) Filed: Apr. 30, 2024

(65) Prior Publication Data

US 2024/0372953 A1 Nov. 7, 2024

(30) Foreign Application Priority Data

May 1, 2023 (JP) ................................ 2023-075869

(51) Int. Cl.
*H04N 1/00* (2006.01)
*G03G 15/01* (2006.01)
(Continued)

(52) U.S. Cl.
CPC ......... *H04N 1/00806* (2013.01); *H04N 1/031* (2013.01); *H04N 1/12* (2013.01); *G03G 15/0189* (2013.01); *H04N 1/2034* (2013.01); *H04N 2201/0081* (2013.01); *H04N 2201/0094* (2013.01)

(58) Field of Classification Search
CPC ...... H04N 1/00806; H04N 1/031; H04N 1/12; H04N 1/2034; H04N 2201/0081; H04N 2201/0094; H04N 1/00708; H04N 1/0071; H04N 1/00713; H04N 1/00737; H04N 1/00748; G03G 15/0189
See application file for complete search history.

(56) References Cited

U.S. PATENT DOCUMENTS

2013/0209116 A1* 8/2013 Furuya ............... G03G 15/5041 399/49
2015/0326743 A1* 11/2015 Yabuuchi ........... H04N 1/00779 358/498

(Continued)

FOREIGN PATENT DOCUMENTS

JP 2017-216494 12/2017

*Primary Examiner* — Iriana Cruz
(74) *Attorney, Agent, or Firm* — BakerHostetler

(57) ABSTRACT

An image reading device includes a reading section having a plurality of optoelectronic transducers aligned in a main scanning direction, a sub-scanner causing the reading section to scan a first sheet and a second sheet in a sub-scanning direction, and a controller determining an adjustment value defining a length in the sub-scanning direction of image data output by the reading section based on first image data and second image data. The first sheet and the second sheet have the same size. In the first image data, an angle at which the first edge intersects with the main scanning direction is smaller than an angle at which the second edge intersects with the main scanning direction. In the second image data, an angle at which the second edge intersects with the main scanning direction is smaller than an angle at which the first edge intersects with the main scanning direction.

15 Claims, 9 Drawing Sheets

(51) Int. Cl.

| | |
|---|---|
| ***H04N 1/031*** | (2006.01) |
| ***H04N 1/12*** | (2006.01) |
| *H04N 1/203* | (2006.01) |

(56) References Cited

U.S. PATENT DOCUMENTS

| | | | | |
|---|---|---|---|---|
| 2016/0234398 | A1* | 8/2016 | Itou ...................... | H04N 1/0432 |
| 2017/0344819 | A1* | 11/2017 | Murahashi ......... | H04N 1/00702 |
| 2022/0201155 | A1* | 6/2022 | Nakajima ............ | H04N 1/3878 |
| 2024/0114095 | A1* | 4/2024 | Nakayoshi ......... | H04N 1/00074 |

* cited by examiner

IMAGE READING DEVICE, ADJUSTMENT METHOD AND NON-TRANSITORY COMPUTER-READABLE RECORDING MEDIUM ENCODED WITH ADJUSTMENT PROGRAM

CROSS-REFERENCE TO RELATED APPLICATIONS

This application claims priority to Japanese patent Applications No. 2023-075869 filed on May 1, 2023, the entire disclosure of which is incorporated herein by reference.

BACKGROUND OF THE INVENTION

Technical Field

The present invention relates to an image reading device, an adjustment method, and a computer-readable recording medium encoded with an adjustment program. In particular, the present invention relates to an image reading device that reads a sheet in a main scanning direction and a sub-scanning direction, an adjustment method performed in the image reading device and a computer-readable recording medium encoded with an adjustment program that causes a computer to perform the adjustment method.

Description of Related Art

An image forming apparatus such as a Multi Function Peripheral (MFP) reads a document while conveying the document in a sub-scanning direction using a line sensor. The intervals at which the line sensor scans the document in the main scanning direction are the same. Therefore, in a case in which the conveyance speed of a document varies, the length in the sub-scanning direction of image data output by the line sensor may vary.

For example, Japanese Unexamined Patent Publication No. 2017-216494 describes an image reading device characterized by including a feeding section that feeds a document from a placement section in which the document is placeable toward a conveyance path in a direction opposite to a conveyance direction while providing a friction force, a storage that stores a count of fed documents that have been fed by the feeding section, a reading section that reads an image of the document that is conveyed through the conveyance path downstream in the conveyance direction, a correction magnification acquirer that acquires a correction magnification for correcting a read image that has been read by the reading section based on the count of fed documents, and a correction section that corrects a length in the conveyance direction of the read image based on the correction magnification.

However, the image reading device described in Japanese Unexamined Patent Publication No. 2017-216494 acquires a correction magnification for correcting a read image based on the count of fed sheets. Although the correction magnification and the count of fed sheets has a correlation, a frictional force applied to the document varies depending on various factors such as a temperature, a humidity, and a material of the feeding section. Therefore, there is a problem in that it is difficult to accurately correct the length in the conveyance direction.

SUMMARY OF THE INVENTION

According to one aspect of the present invention, an image reading device including a reading section having a plurality of optoelectronic transducers aligned in a main scanning direction, a sub-scanner that causes the reading section to scan a first sheet and a second sheet in a sub-scanning direction orthogonal to the main scanning direction, the first sheet and the second sheet respectively having a first edge and a second edge that intersect with each other and having a same size, and a controller, the controller determining an adjustment value that defines a length in the sub-scanning direction of image data output by the reading section based on first image data and second image data, the first image data being output by the reading section that scans the first sheet in a state in which an angle at which the first edge intersects with the main scanning direction is smaller than an angle at which the second edge intersects with the main scanning direction, the second image data being output by the reading section that scans the second sheet in a state in which an angle at which the second edge intersects with the main scanning direction is smaller than an angle at which the first edge intersects with the main scanning direction.

According to another aspect of the present invention, an adjustment method that is performed in an image reading device including a reading section having a plurality of optoelectronic transducers aligned in a main scanning direction, including a sub-scanning step of causing the reading section to scan a first sheet and a second sheet in a sub-scanning direction orthogonal to the main scanning direction, the first sheet and the second sheet respectively having a first edge and a second edge that intersect with each other and having a same size, and a determining step of determining an adjustment value that defines a length in the sub-scanning direction of image data output by the reading section based on first image data and second image data, the first image data being output by the reading section that scans the first sheet in a state in which an angle at which the first edge intersects with the main scanning direction is smaller than an angle at which the second edge intersects with the main scanning direction, the second image data being output by the reading section that scans the second sheet in a state in which an angle at which the second edge intersects with the main scanning direction is smaller than an angle at which the first edge intersects with the main scanning direction.

According to another aspect of the present invention, a non-transitory computer-readable recording medium encoded with an adjustment program executed in a computer that controls an image reading device including a reading section having a plurality of optoelectronic transducers aligned in a main scanning direction, the adjustment program causing the computer to execute a sub-scanning step of causing the reading section to scan a first sheet and a second sheet in a sub-scanning direction orthogonal to the main scanning direction, the first sheet and the second sheet respectively having a first edge and a second edge that intersect with each other and having a same size, and a determining step of determining an adjustment value that defines a length in the sub-scanning direction of image data output by the reading section based on first image data and second image data, the first image data being output by the reading section that scans the first sheet in a state in which an angle at which the first edge intersects with the main scanning direction is smaller than an angle at which the second edge intersects with the main scanning direction, the second image data being output by the reading section that scans the second sheet in a state in which an angle at which the second edge intersects with the main scanning direction is smaller than an angle at which the first edge intersects with the main scanning direction.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION

Figure 1:
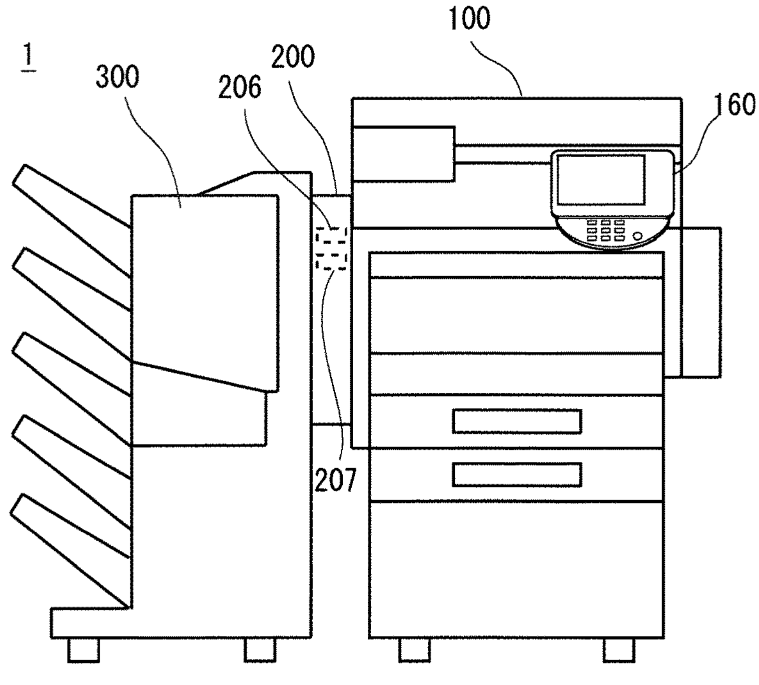
FIG. 1 is a perspective view illustrating the appearance of an image forming system in one embodiment in the present invention.

Hereinafter, one or more embodiments of the present invention will be described with reference to the drawings. However, the scope of the invention is not limited to the disclosed embodiments. An image forming system in embodiments of the present invention will be described below with reference to the drawings. In the following description, the same components are denoted by the same reference numerals. Their names and functions are the same. Therefore, a detailed description thereof will not be repeated.

First Embodiment

FIG. 1 is a perspective view illustrating the appearance of an image forming system in one embodiment in the present invention. With reference to FIG. 1, the image forming system 1 may comprise a Multi Function Peripheral (MFP) 100, an inspection apparatus 200 and a post-processing apparatus 300. The MFP 100 may read a document and forms an image on a sheet based on image data obtained by reading the document. The MFP 100 may form an image on any one of a plurality of types of sheets as a sheet on which an image is to be formed. A sheet may comprise an overhead projector (OHP) sheet, a cloth or the like in addition to a sheet such as a paper. Further, in the following description, a sheet may be used as a paper by way of example unless otherwise specified.

A sheet on which an image has been formed may be supplied to the inspection apparatus 200 from the MFP 100, and the inspection apparatus 200 detects a dust or a stain adhering to the image formed on the sheet as a noise generated due to a defect at the time of image formation.

A sheet may be supplied from the inspection apparatus 200 to the post-processing apparatus 300. The post-processing apparatus 300 has a plurality of sheet ejection trays and has a sorting function of sorting a plurality of sheets and discharging the respective sheets to the plurality of respective sheet ejection trays. Further, the post-processing apparatus 300 discharges a sheet having a noise detected by the inspection apparatus 200 in regard to an image that has been formed on the sheet to another sheet ejection tray different from a sheet ejection tray for sheets having no detected noise. Specifically, in a case in which an error signal may be received from the inspection apparatus 200, the sheet corresponding to the error signal may be ejected to the predetermined sheet ejection tray. Note that the post-processing apparatus 300 may comprise a punching mechanism and a stapling mechanism. The punching mechanism may be a mechanism that creates holes in a bundle of a plurality of sheets. The stapling mechanism may be a mechanism that inserts staples into a bundle of a plurality of sheets.

Figure 2:
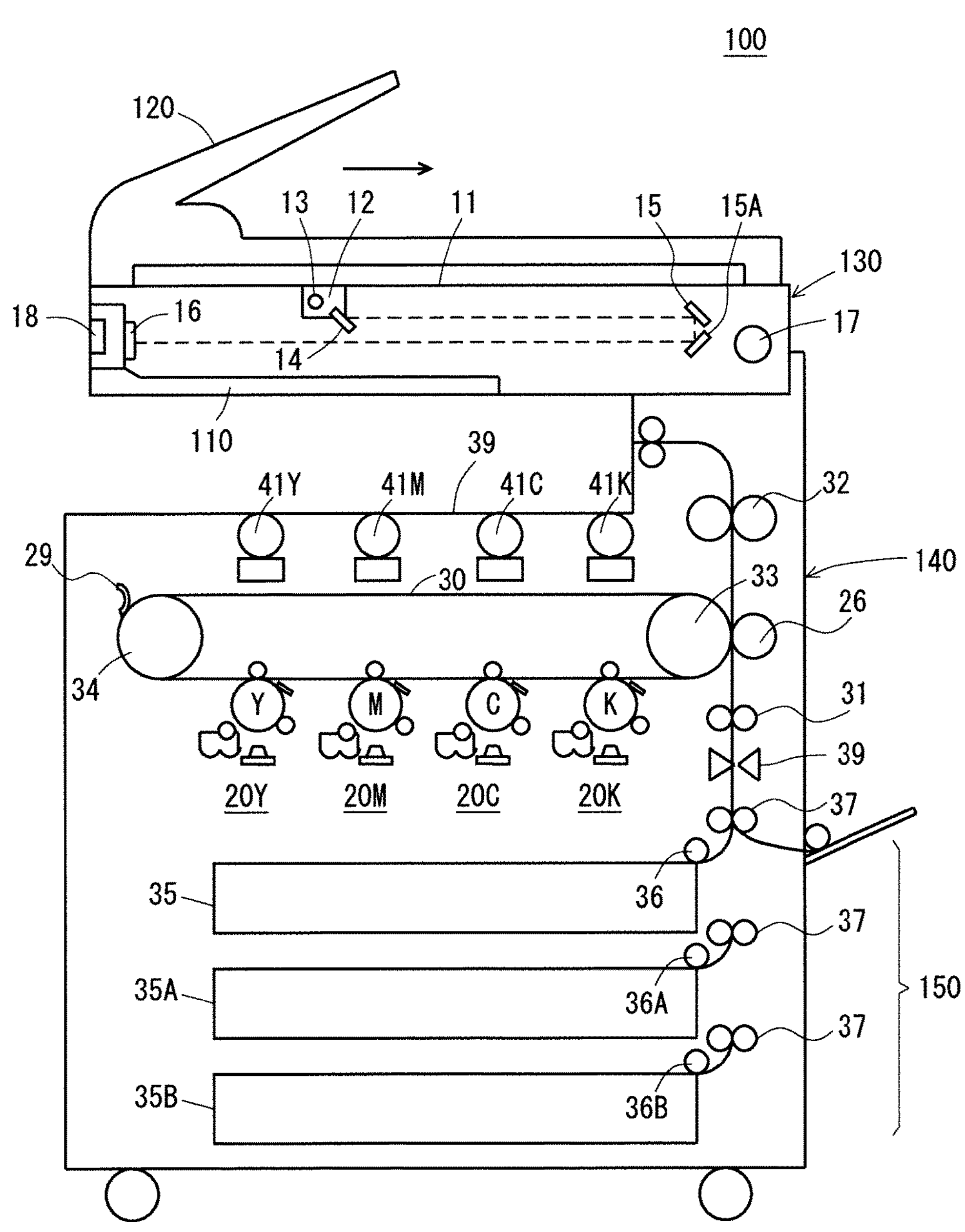
FIG. 2 is a schematic cross-sectional view illustrating the inner configuration of an MFP.

FIG. 2 is a schematic cross-sectional view illustrating the inner configuration of the MFP. With reference to FIG. 2, the MFP 100 may comprise an document reading section 130 that reads a document, an automatic document conveyance apparatus 120 that conveys a document to the document reading section 130, an image forming section 140 that forms an image on a sheet based on image data and a sheet feed section 150 that supplies a sheet to the image forming section 140. The MFP 100 may be one example of an image reading device.

The document reading section 130 reads an image formed on a document. A document may be one example of a sheet. In the present embodiment, a document may be a sheet by way of example. The document reading section 130 exposes an image of a document set on a document glass 11 by the automatic document conveyance apparatus 120 with an exposure lamp 13 attached to a slider 12 moving below the document. Light reflected from the document may be guided to a lens 16 by a mirror 14 and two reflecting mirrors 15, 15A, and forms an image on a Charge Coupled Devices (CCD) sensor 18. The CCD sensor 18 may comprise a plurality of optoelectronic transducers aligned in a main scanning direction.

The reflected light that has formed an image on the CCD sensor 18 may be converted into image data as an electric signal in the CCD sensor 18. The image data may be converted into printing data of cyan (C), magenta (M), yellow (Y) and black (K), and output to the image forming section 140.

The image forming section 140 has developing units 20Y, 20M, 20C, 20K and toner bottles 41Y, 41M, 41C, 41K, that correspond to yellow, magenta, cyan and black, respectively. Here, "Y," "M," "C" and "K" represent yellow, magenta, cyan and black, respectively.

The only difference among the developing units 20Y, 20M, 20C, 20K may be the color of toner used by the developing units 20Y, 20M, 20C, 20K. Further, the only difference among the toner bottles 41Y, 41M, 41C, 41K may be the color of toner used by the toner bottles 41Y, 41M, 41C, 41K. Therefore, the developing unit 20Y and the toner bottle 41Y for forming an image in yellow will be described here.

The toner bottle 41Y contains a yellow toner. The toner bottle 41Y may be rotated with a toner bottle motor used as a drive source to discharge the toner to the outside. The toner that has been discharged from the toner bottle 41Y may be supplied to the developing unit 20Y. The toner bottle 41Y supplies the toner to the developing unit 20Y in response to the remaining amount of the toner, contained in the developing unit 20Y, becoming equal to or smaller than a predetermined lower limit value.

The intermediate transfer belt 30 may be suspended by a driving roller 33 and a driven roller 34 so as not to loosen. When the driving roller 33 is rotated in the counterclockwise direction in FIG. 2, the intermediate transfer belt 30 may be rotated in the counterclockwise direction in the diagram at a predetermined speed. The driven roller 34 may be rotated in the counterclockwise direction in accordance with rotation of the intermediate transfer belt 30.

The developing unit 20Y contains a developer. The developer may comprise a non-magnetic toner and a magnetic carrier. The developing unit 20Y may be supplied with the toner by the toner bottle 41Y and stirs the carrier and the toner. The developing unit 20Y forms a toner image with the toner comprised in the developer and transfers the toner image onto the intermediate transfer belt 30. The timing for transferring a toner image onto the intermediate transfer belt 30 by the developing unit 20Y may be adjusted by detection of a reference mark provided on the intermediate transfer belt 30. A belt cleaning blade 29 may be provided at a position farther upstream than the developing unit 20Y of the intermediate transfer belt 30. The belt cleaning blade 29 removes a toner remaining on the intermediate transfer belt 30 without being transferred onto a sheet.

When forming a full-color image, the MFP 100 drives all of the developing units 20Y, 20M, 20C, 20K. Thus, toner images in yellow, magenta, cyan and black are superimposed on the intermediate transfer belt 30. In a case in which forming a monochrome image, the MFP 100 drives any one of the developing units 20Y, 20M, 20C, 20K. Further, it may be also possible to form an image by combining two or more of the developing units 20Y, 20M, 20C, 20K.

In sheet feed cassettes 35, 35A, 35B, sheets in different sizes are respectively set. The sheets respectively contained in the sheet feed cassettes 35, 35A, 35B are supplied to a conveyance path by pickup rollers 36, 36A, 36B respectively attached to the sheet feed cassettes 35, 35A, 35B and are sent to a timing roller 31 by a sheet feed roller 37.

A type detection sensor 39 may be arranged between the sheet feed roller 37 and the timing roller 31. The type detection sensor 39 may comprise a light emitter and a light receiver that are arranged opposite to each other with the sheet conveyance path interposed therebetween. The type detection sensor 39 detects the medium type of a sheet in a period during which the sheet conveyed by the sheet feed roller 37 passes between the light emitter and the light receiver. The medium type indicates the basis weight of the sheet. The medium type may also be the thickness and material of the sheet. Specifically, the type detection sensor 39 may calculate the ratio of an amount of light received by the light receiver with respect to an amount of light emitted by the light emitter as a transmittance, and may determine the basis weight with respect to the transmittance based on the calculated transmittance using conversion information. The conversion information may be generated in advance by an experiment or the like, and may be stored in an HDD 115. The conversion information may be a table that defines the relationship between a transmittance and a medium type.

The timing roller 31 conveys a sheet conveyed by the sheet feed roller 37 to a nip portion between the intermediate transfer belt 30 and a secondary transfer roller 26 serving as a transfer member. The secondary transfer roller 26 generates an electric field in the nip portion. In this nip portion, due to the effect of an electric field force, a toner image that has been formed on the intermediate transfer belt 30 may be transferred onto a sheet conveyed by the timing roller 31. The sheet to which the toner image has been transferred may be conveyed to a fixing roller 32 to be heated and pressurized by the fixing roller 32. Thus, the toner may be fused and fixed to the sheet. Thereafter, the sheet may be conveyed to the inspection apparatus 200. The inspection apparatus 200 may be one example of the image reading device, and reads an image formed on a sheet conveyed from the MFP 100.

While the MFP 100 that uses a tandem system comprising the developing units 24Y, 24M, 24C, 24K that form toners of four colors on a sheet may be described here by way of example, a four-cycle system that sequentially transfer toners of four colors onto a sheet by one photosensitive drum may be used.

Figure 3:
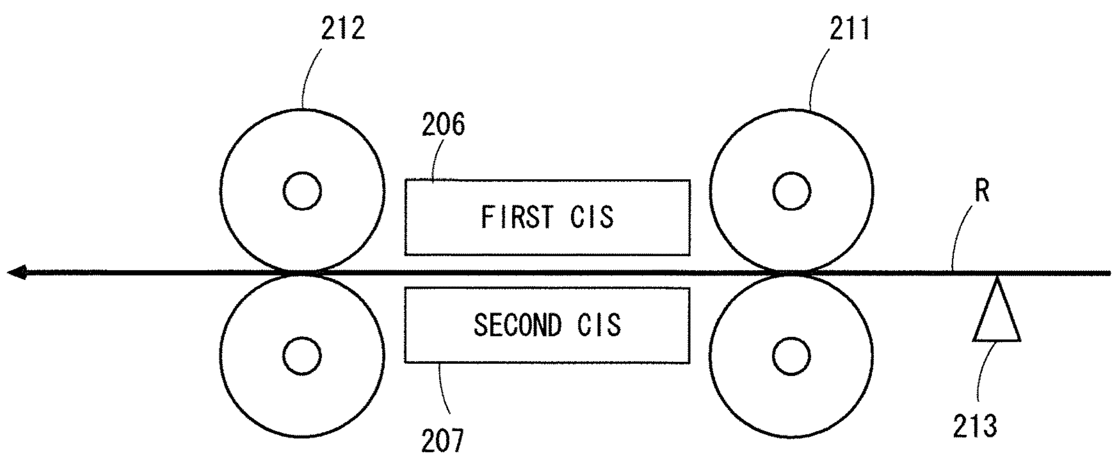
FIG. 3 is a diagram schematically illustrating the inner configuration of an inspection apparatus in the present embodiment.

FIG. 3 is a diagram schematically illustrating the inner configuration of the inspection apparatus in the present embodiment. With reference to FIG. 3, the inspection apparatus 200 may comprise a sheet detection sensor 213, a pair of first conveyance rollers 211, a first Contact Image Sensor (CIS) 206, a second Contact Image Sensor (CIS) 207 and a pair of second conveyance rollers 212. The sheet detection sensor 213, the pair of first conveyance rollers 211, the first CIS 206, the second CIS 207 and the pair of second conveyance rollers 212 are arranged along the conveyance path R. Further, the sheet detection sensor 213, the pair of first conveyance rollers 211 and the pair of second conveyance rollers 212 are arranged in this order in the conveyance direction.

The sheet detection sensor 213 may be a photoelectric sensor and detects a sheet to be conveyed along the conveyance path R. Specifically, the sheet detection sensor 213 may comprise a light emitter and a light receiver. The light receiver receives the light emitted by the light emitter. In a case in which passing through the sheet detection sensor 213, a sheet conveyed along the conveyance path R shields the light emitted by the light emitter. Therefore, an amount of light received by the light receiver may be decreased. The photoelectric sensor detects the sheet by detecting a change in amount of light received by the light receiver.

The first CIS 206 and the second CIS 207 are arranged between the pair of first conveyance rollers 211 and the pair of second conveyance rollers 212. The first CIS 206 and the second CIS 207 are arranged to be opposite to each other with the conveyance path R interposed therebetween. Each of the first CIS 206 and the second CIS 207 may be a contact image sensor. A reading surface of each of the first CIS 206 and the second CIS 207 may be directed toward the conveyance path R.

A sheet discharged from the MFP 100 is conveyed through the conveyance path R and received by the pair of first conveyance rollers 211. The pair of first conveyance rollers 211 conveys the sheet toward the pair of second conveyance rollers 212. In a period during which the sheet passes between the first CIS 206 and the second CIS 207, the first CIS 206 reads the upper surface of the sheet, and the second CIS 207 reads the lower surface of the sheet. The pair of second conveyance rollers 212 output the sheet conveyed by the pair of first conveyance rollers 211 to the post-processing apparatus 300.

A point in time at which the first CIS 206 and the second CIS 207 respectively read the sheet are defined based on a point in time at which the tip of the sheet is detected by the sheet detection sensor 213. The distance between the sheet detection sensor 213, and the first CIS 206 and the second CIS 207 may be defined in advance, and a speed at which the pair of first conveyance rollers 211 convey the sheet may be defined in advance. Each of the first CIS 206 and the second CIS 207 starts reading the sheet after a predetermined period of time has elapsed since detection of the tip of the sheet by the sheet detection sensor 213.

Figure 4:
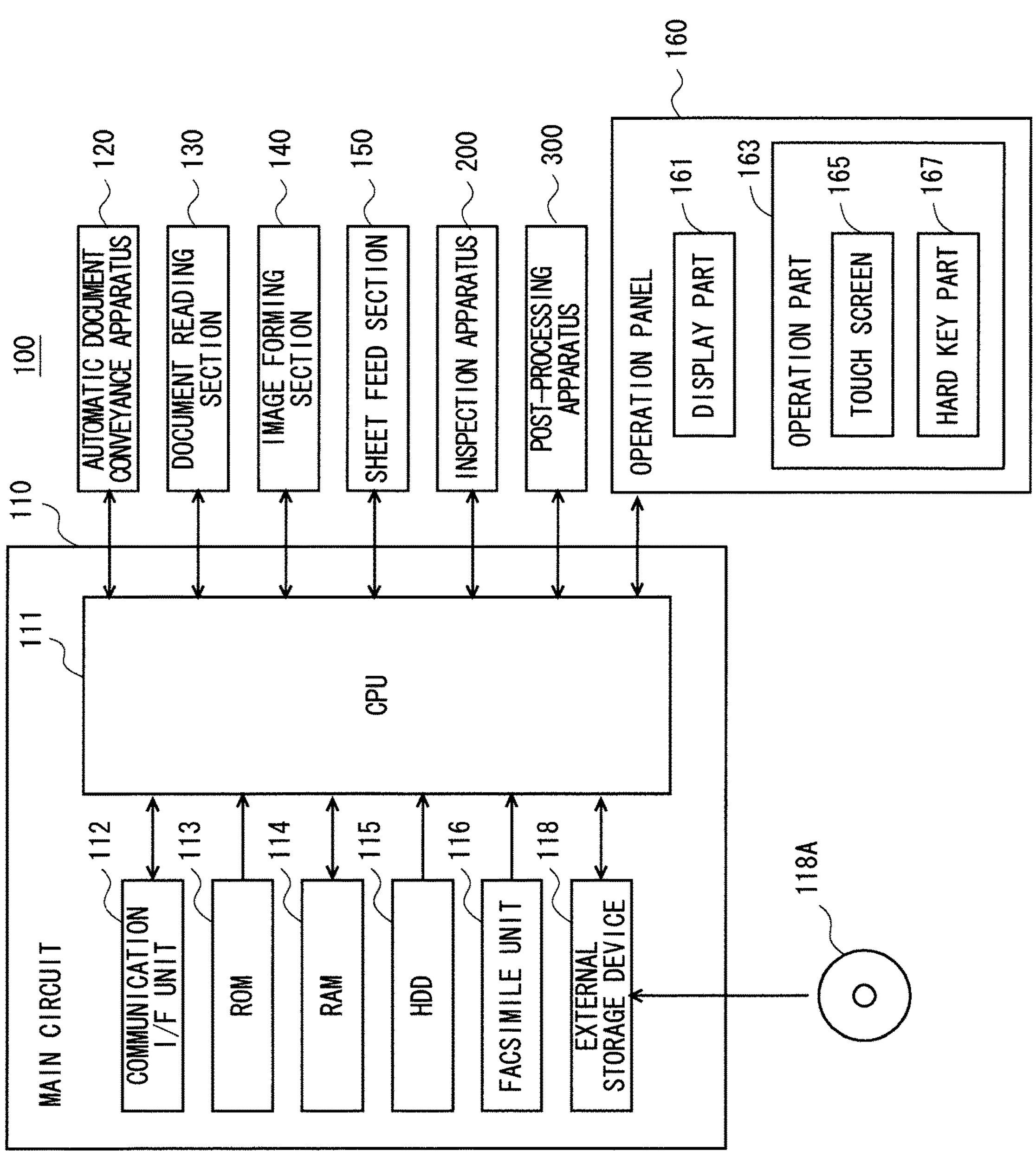
FIG. 4 is a block diagram illustrating the outline of the hardware configuration of the MFP in the present embodiment.

FIG. 4 is a block diagram illustrating the outline of the hardware configuration of the MFP in the present embodiment. With reference to FIG. 4, the MFP 100 may comprise a main circuit 110. The main circuit 110 may comprise a CPU (Central Processing Unit) 111 for controlling the MFP 100 as a whole, a communication interface (I/F) unit 112, a Read Only Memory (ROM) 113, a Random Access Memory (RAM) 114, a Hard Disc Drive (HDD) 115 that may be used as a mass storage device, a facsimile unit 116 and an external storage device 118. The CPU 111 may be connected to the automatic document conveyance apparatus 120, the document reading section 130, the image forming section 140, the sheet feed section 150, the inspection apparatus 200, the post-processing apparatus 300 and the operation panel 160, and controls the MFP 100 as a whole.

The ROM 113 stores a program to be executed by the CPU 111 or data required for execution of the program. The RAM 114 may be used as a work area when the CPU 111 executes the program. Further, the RAM 114 temporarily stores image data continuously sent from the document reading section 130.

The operation panel 160 may be provided in an upper portion of the MFP 100.

The operation panel 160 may comprise a display part 161 and an operation part 163.

The display part 161 may be a Liquid Crystal Display Device (LCD), for example, and displays an instruction menu for a user, information about acquired image data, etc. As long as displaying images, an organic Electroluminescence (EL) display, for example, can be used instead of the LCD.

The operation part 163 may comprise a touch screen 165 and a hard key part 167. The touch screen 165 may be a capacitance type. The touch screen 165 may not be limited to the capacitance type, and another type such as a resistive film type, a surface acoustic wave type, an infrared type and an electromagnetic induction type can be used.

The touch screen 165 may be provided with its detection surface being superimposed on an upper surface or a lower surface of the display part 161. Here, the size of the detection surface of the touch screen 165 and the size of the display surface of the display part 161 are the same. Therefore, the coordinate system of the display surface and the coordinate system of the detection surface are the same. The touch screen 165 detects a position designated by the user on the display surface of the display part 161 using the detection surface, and outputs a set of coordinates of the detected position to the CPU 111. Because the coordinate system of the display surface and the coordinate system of the detection surface are the same, the set of coordinates output by the touch screen 165 can be replaced with the set of coordinates of the display surface.

The hard key part 167 may comprise a plurality of hard keys. The hard keys are contact switches, for example. The touch screen 165 detects a position designated by the user on the display surface of the display part 161. In a case in which operating the MFP 100, the user may be likely to be in an upright posture. Therefore, the display surface of the display part 161, the operation surface of the touch screen 165 and the hard key part 167 are arranged to be directed upwardly. Therefore, the user can easily view the display surface of the display part 161 and can easily provide an instruction with his or her finger using the operation part 163.

The communication I/F unit 112 may be an interface for connecting the MFP 100 to a network. The communication I/F unit 112 communicates with another computer or a data processing apparatus connected to the network using a communication protocol such as a Transmission Control Protocol (TCP) or a File Transfer Protocol (FTP). The network to which the communication I/F unit 112 may be connected may be a Local Area Network (LAN), and its connection form may be either wired or wireless. Further, the network may not be limited to a LAN and may be a Wide Area Network (WAN), a Public Switched Telephone Network (PSTN), the Internet or the like.

The facsimile unit 116 may be connected to the Public Switched Telephone Network (PSTN), transmits facsimile data to the PSTN or receives facsimile data from the PSTN. The facsimile unit 116 stores the received facsimile data in the HDD 115, converts the facsimile data into print data that may be printable in the image forming section 140 and outputs the print data to the image forming section 140. Thus, the image forming section 140 forms an image represented by the facsimile data received from the facsimile unit 116 on a sheet. Further, the facsimile unit 116 converts the data stored in the HDD 115 into facsimile data and transmits the converted facsimile data to a facsimile machine connected to the PSTN.

The external storage device 118 may be controlled by the CPU 111 and mounted with a Compact Disk Read Only Memory (CD-ROM) 118A or a semiconductor memory. While the CPU 111 executes a program stored in the ROM 113 by way of example in the present embodiment, the CPU 111 may control the external storage device 118, read a program to be executed by the CPU 111 from the CD-ROM 118A and store the read program in the RAM 114 for execution.

It may be noted that a recording medium for storing a program to be executed by the CPU 111 may not be limited to the CD-ROM 118A. It may be a flexible disc, a cassette tape, an optical disc (Magnetic Optical Disc (MO)/Mini Disc (MD)/Digital Versatile Disc (DVD)), an IC card, an optical card, and a semiconductor memory such as a mask ROM and an Erasable Programmable ROM (EPROM). Further, the CPU 111 may download a program from a computer connected to a network and store the program in the HDD 115, or the computer connected to the network may write a program in the HDD 115. Then, a program stored in the HDD 115 may be loaded into the RAM 114 to be executed by the CPU 111. The program referred to here may comprise not only a program directly executable by the CPU 111 but also a source program, a compressed program, an encrypted program and the like.

Figure 5:
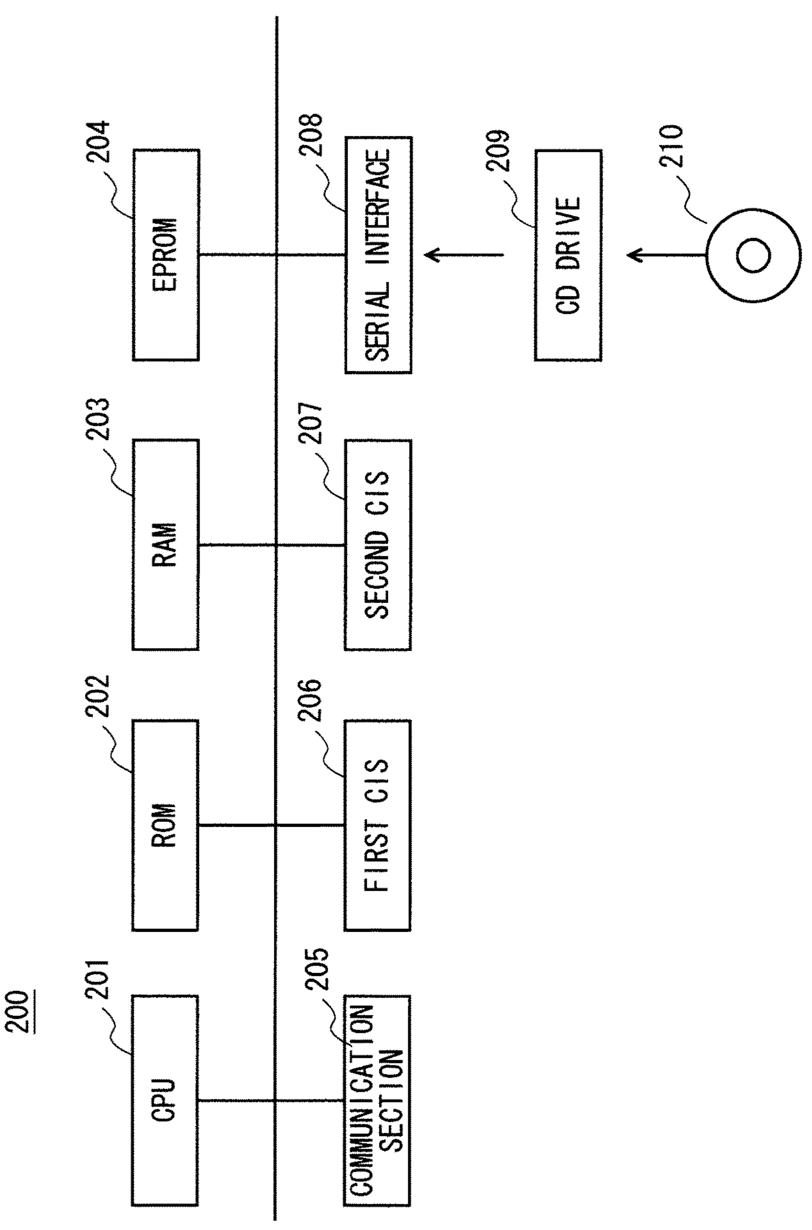
FIG. 5 is a block diagram illustrating one example of the hardware configuration of the inspection apparatus.

FIG. 5 is a block diagram illustrating one example of the hardware configuration of the inspection apparatus. With reference to FIG. 5, the inspection apparatus 200 may comprise a Central Processing Unit (CPU) 201 for controlling the inspection apparatus 200 as a whole, a Read Only Memory (ROM) 202 for storing a program to be executed by the CPU 201, a Random Access Memory (RAM) 203 that may be used as a work area for the CPU 201, a Erasable Programmable ROM (EPROM) 204 for storing data in a non-volatile manner, a communication section 205 that connects the CPU 201 to the MFP 100 and the post-processing apparatus 300, the first CIS 206, the second CIS 207 and a serial interface 208.

The serial interface 208 may be an interface for serial communication with an external device. Here, the serial communication may be performed using a USB (Universal Serial Bus) standard. An external device communicable using the USB standard may be connectable to the serial interface 208. The CPU 201 can access the external device via the serial interface 208. The external device may comprise a storage device such as a CD drive 209 or a USB memory. Here, the external device may be the CD drive 209, by way of example. The CD-ROM 210 may be attachable to and detachable from the CD drive. The CPU 201 loads a program recorded in the CD-ROM 210 attached to the CD drive 209 into the RAM 203 for execution.

Each of the first CIS 206 and the second CIS 207 may be a optoelectronic transducer, converts received light into read data as an electrical signal and outputs the read data. The first CIS 206 optically reads an image formed on the front side of a sheet supplied from the MFP 100, and outputs image data, which may be electronic data, to the CPU 201. The second CIS 207 optically reads an image formed on the back side of the sheet supplied from the MFP 100 and outputs image data, which may be electronic data, to the CPU 201.

It may be noted that a medium for storing a program to be executed by the CPU 201 may not be limited to the CD-ROM 210. It may be an optical disc (Compact Disk ROM (CD-ROM), Magnetic Optical Disc (MO)/Mini Disc (MD)/ Digital Versatile Disc (DVD)), an optical card, and a semiconductor memory such as a mask ROM or an EPROM (Erasable Programmable ROM). Further, in a case in which a program to be executed by the CPU 201 may be stored in a semiconductor memory, the external device may be a USB memory, for example. The USB memory may comprise a semiconductor memory such as an EPROM, and a serial communication circuit. The CPU 201 loads a program recorded on the CD-ROM 210 into the RAM 203 and executes the program.

The program referred to here may comprise not only a program directly executable by the CPU 201 but also a source program, a compressed program, an encrypted program and the like.

Further, the inspection apparatus 200 may be connected to the Internet via the communication section 205 or the serial interface 208. In this case, the CPU 201 can download a program from a computer connected to the Internet and store the program in the EPROM 204. Further, the program may be written into the EPROM 204 by the computer connected to the Internet. The CPU 201 loads a program stored in the EPROM 204 into the RAM 203 and executes the program.

Figure 6:
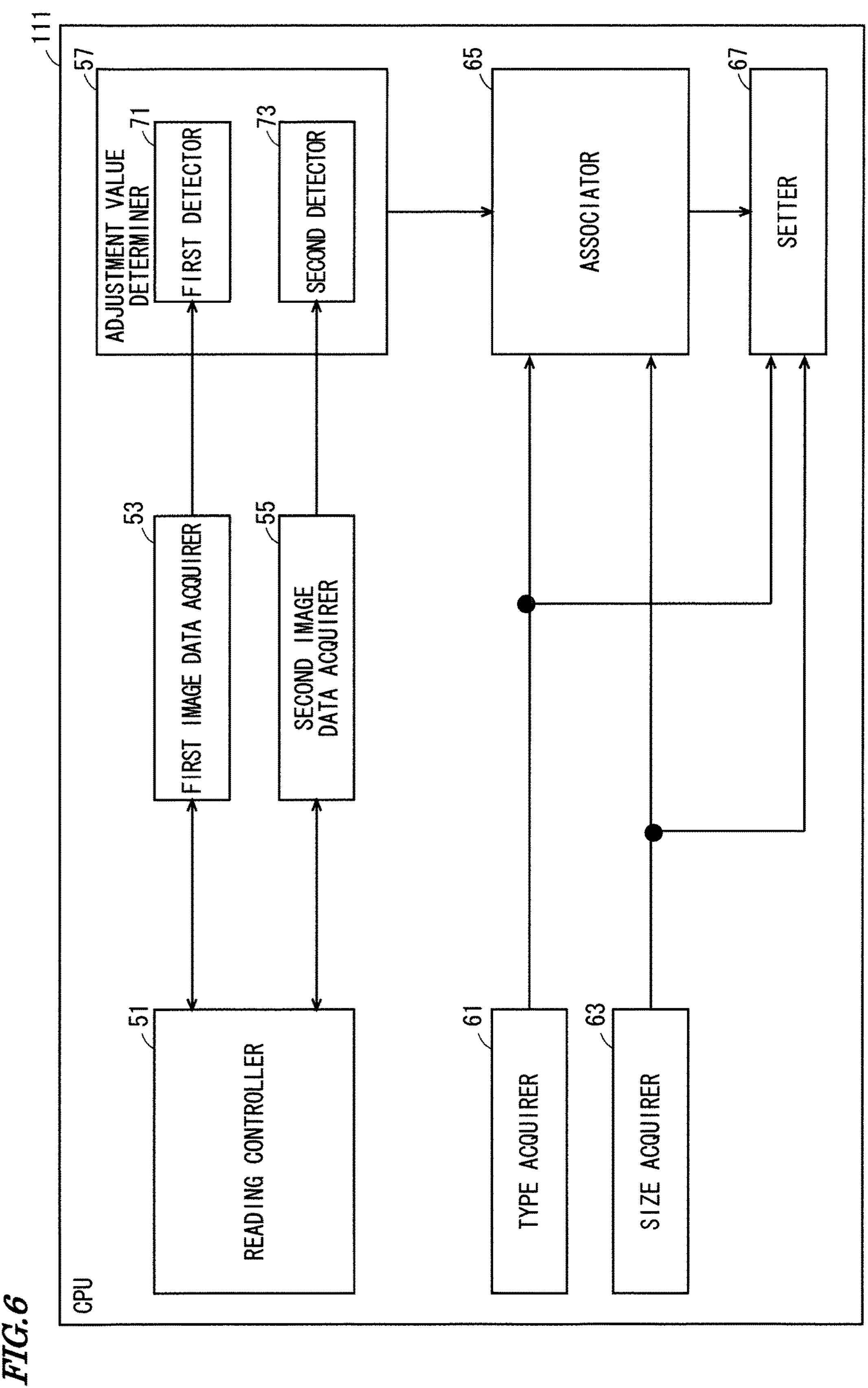
FIG. 6 is a block diagram illustrating one example of the functions of a CPU included in the MFP.

FIG. 6 is a block diagram illustrating one example of the functions of the CPU comprised in the MFP. The functions illustrated in FIG. 6 are implemented by the CPU 111 in a case in which the CPU 111 comprised in the MFP 100 executes an adjustment program stored in the ROM 113, the RAM 114, the HDD 115 or the CD-ROM 118A. With reference to FIG. 6, the CPU 111 may comprise a reading controller 51, a first image data acquirer 53, a second image data acquirer 55, an adjustment value determiner 57, a type acquirer 61, a size acquirer 63, an associator 65 and a setter 67.

The reading controller 51 controls the document reading section 130, causes the document reading section 130 to read a document, and acquires image data output by the document reading section 130. As described above, the document reading section 130 exposes an image of a document set on the document glass 11 with the exposure lamp 13 attached to the slider 12. The light reflected from the document forms an image on the CCD sensor 18. The CCD sensor 18 has a plurality of optoelectronic transducers aligned in the main scanning direction. Therefore, a document may be scanned in the main scanning direction by the CCD sensor 18. Further, in a period during which the slider 12 moves in a sub-scanning direction, the CCD sensor 18 repeats scanning a document in the main scanning direction at predetermined time intervals. Therefore, the CCD sensor 18 scans the document in the sub-scanning direction due to the movement of the slider 12. Therefore, the length in the main scanning direction of the image data output by the CCD sensor 18 may be determined by the length in the main scanning direction of the plurality of optoelectronic transducers aligned in the main scanning direction. Further, the length in the sub-scanning direction of the image data output by the CCD sensor 18 may be determined based on the distance by which the slider 12 moves in the sub-scanning direction. While being designed to be orthogonal to the main scanning direction, the sub-scanning direction in which the slider 12 moves might not be orthogonal to the main scanning direction due to a manufacturing error. The angle at which the main scanning direction and the sub-scanning direction are orthogonal to each other may also comprise an angle comprising a manufacturing error.

The first image data acquirer 53 and the second image data acquirer 55 acquire image data output by the document reading section 130 when the document reading section 130 reads the same document in different directions. Here, in a case in which an X direction and a Y direction that are orthogonal to each other are defined, among four edges that form the outline of a document, the length of a first edge that is parallel to the Y direction may be YL, and the length of a second edge that is parallel to the X direction may be XL. Further, YL>YX. Here, an operation of reading a document having the second edge (X direction) that is parallel to the sub-scanning direction by the document reading section 130 may be referred to as a lateral-direction reading operation, and an operation of reading a document having the first edge (Y direction) that is parallel to the sub-scanning direction may be referred to as a longitudinal-direction reading operation. Because of a manufacturing error of a document, the first edge and the second edge are not necessarily orthogonal to each other. Here, an angle at which the X direction and the Y direction intersect with each other indicates an angle at which the first edge and the second edge intersect with each other, and may comprise a manufacturing error.

Since the document reading section 130 reads a document set on the document glass 11, the document may not be necessarily set such that the first edge (Y direction) or the second edge (X direction) of the document may be parallel to the sub-scanning direction. In this case, in the lateral-direction reading operation, an angle at which the first edge (Y direction) of the document and the main scanning direction intersect with each other may be smaller than an angle at which the second edge (X direction) and the main scanning direction intersect with each other. Similarly, in the longitudinal-direction reading operation, an angle at which the second edge (X direction) of the document and the main scanning direction intersect with each other may be smaller than an angle at which the first edge (Y direction) and the main scanning direction intersect with each other.

One of the first image data acquirer 53 and the second image data acquirer 55 causes the document reading section 130 to perform the longitudinal-direction reading operation, and the other one of the first image data acquirer 53 and the second image data acquirer 55 causes the document reading section 130 to perform the lateral-direction reading operation. Here, the first image data acquirer 53 causes the document reading section 130 to perform the longitudinal-direction reading operation, and the second image data acquirer 55 causes the document reading section 130 to perform the lateral-direction reading operation, by way of example.

The first image data acquirer 53 displays a first guide screen on the display part 161. The first guide screen may be a screen that informs the user of a method of placing a document. Specifically, the first guide screen may comprise the information for informing the user of the front side and the back side of a document and the orientation of a document to be placed on a document tray of the automatic document conveyance apparatus 120.

Figure 7:
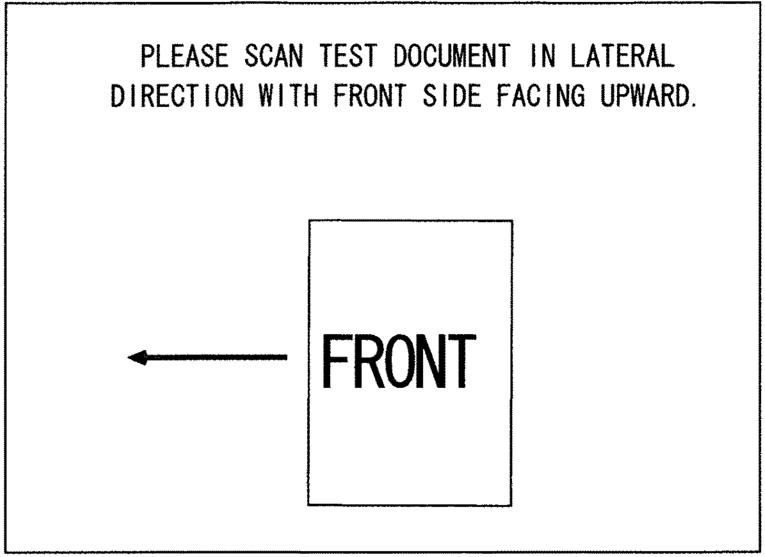
FIG. 7 is a diagram illustrating one example of a first guide screen.

FIG. 7 is a diagram illustrating one example of the first guide screen. With reference to FIG. 7, the first guide screen may comprise the message "PLEASE SCAN TEST DOCUMENT IN LATERAL DIRECTION WITH FRONT SIDE FACING UPWARD," an image indicating the front side of a document and the orientation of the document, and the arrow. In the present embodiment, in a test document, the characters indicating the front side or the back side of the document, and the arrows indicating the orientation of the document are respectively provided on the front side and the back side. Here, the characters "FRONT" are illustrated on the front side of the document, and the characters "BACK" are illustrated on the back side. The direction orthogonal to the direction from "F" toward "T" in the characters "FRONT" may be parallel to the Y direction of the document, and the direction orthogonal to the direction from "B" toward "K" in the characters "BACK" may be parallel to the Y direction of the document. Further, the direction orthogonal to the direction from "B" toward "K" in the characters "BACK" corresponds to the direction orthogonal to the direction from "F" toward "T" in the characters "FRONT." The arrow indicates the conveyance direction of the document, may be parallel to the sub-scanning direction, and may be oriented in the direction from "T" toward "F" in the characters "FRONT" illustrated on the front side of the document.

Referring back to FIG. 6, with the first guide screen displayed on the display part 161, the first image data acquirer 53 receives an operation of providing an scanning instruction, which may be input to the operation part 163 by the user. In response to receiving an operation of providing the scanning instruction, the first image data acquirer 53 instructs the reading controller 51 to perform a reading operation. When the instruction for performing the scanning operation is provided, the reading controller 51 causes the document reading section 130 to read the test document, acquires image data output by the document reading section 130, and outputs the image data to the first image data acquirer 53. The first image data acquirer 53 outputs the image data received from the reading controller 51 to the adjustment value determiner 57 as first image data.

The second image data acquirer 55 displays a second guide screen on the display part 161. The second guide screen may be a screen that informs the user of a method of placing a document. Specifically, the second guide screen comprises the information for informing the user of the front side and the back side of a document and the orientation of the document to be placed on the document tray of the automatic document conveyance apparatus 120.

Figure 8:
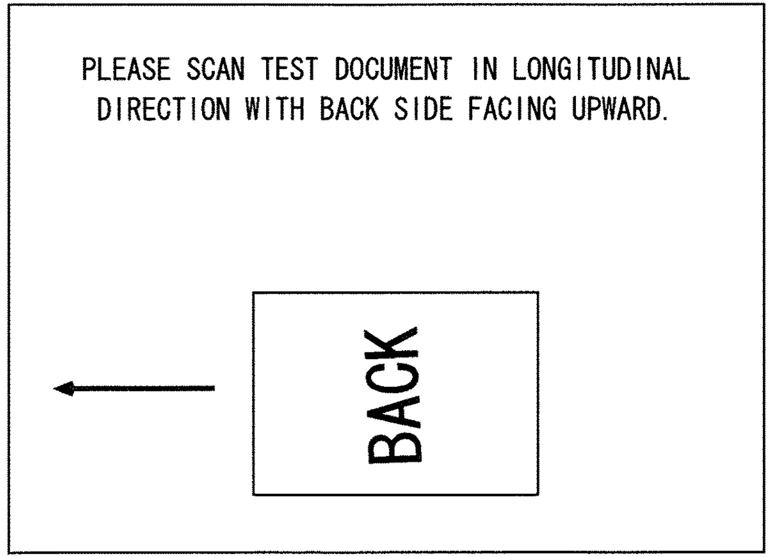
FIG. 8 is a diagram illustrating one example of a second guide screen.

FIG. 8 is a diagram illustrating one example of the second guide screen. With reference to FIG. 8, the second guide screen may comprise the message "PLEASE SCAN TEST DOCUMENT IN LONGITUDINAL DIRECTION WITH BACK SIDE FACING UPWARD," an image indicating the back side of a document and the orientation of the document, and the arrow." The arrow indicates the conveyance direction of the document, may be parallel to the sub-scanning direction, and may be oriented in the direction orthogonal to the direction from "B" toward "K" in the characters "BACK" illustrated on the back side of the document.

Referring back to FIG. 6, with the second guide screen displayed on the display part 161, the second image data acquirer 55 receives an operation of providing a scanning instruction, which may be input to the operation part 163 by the user. The user views the second guide screen, sets the same test document as the test document, previously set in the automatic document conveyance apparatus 120, in the automatic document conveyance apparatus 120, and operates the operation part 163. In response to receiving an operation of providing the scanning instruction, the second image data acquirer 55 instructs the reading controller 51 to perform the reading operation. When an instruction for performing the reading operation is provided, the reading controller 51 causes the document reading section 130 to read the test document, acquires image data output by the document reading section 130, and outputs the image data to the second image data acquirer 55. The second image data acquirer 55 outputs the image data received from the reading controller 51 to the adjustment value determiner 57 as second image data.

The adjustment value determiner 57 may comprise a first detector 71 and a second detector 73. The first detector 71 receives first image data from the first image data acquirer 53. The first detector 71 extracts a sheet image from the first image data, detects the length Y1 of the first edge of the sheet image, and determines the detected length Y1 of the first edge as a first measurement value.

The second detector 73 receives second image data from the second image data acquirer 55. The second detector 73 extracts a sheet image from the second image data, detects the length Y2 of the first edge of the sheet image, and determines the detected length Y2 of the first edge as a second measurement value.

Figure 9:
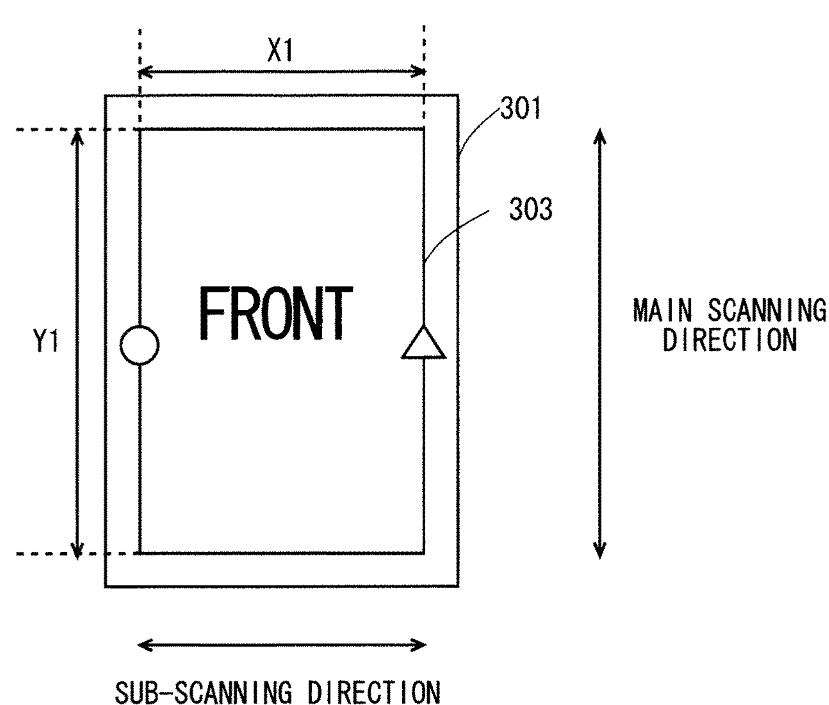
FIG. 9 is a diagram illustrating one example of first image data.
Figure 10:
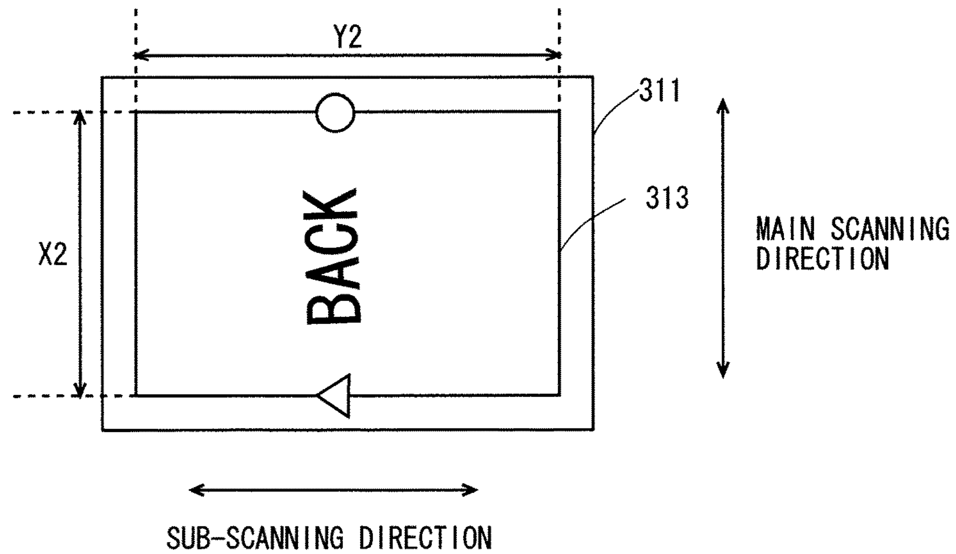
FIG. 10 is a diagram illustrating one example of second image data.

FIG. 9 is a diagram illustrating one example of the first image data. FIG. 10 is a diagram illustrating one example of the second image data. With reference to FIG. 9, the first edge of a sheet image 303 comprised in the first image data 301 may be indicated by the circle. Note that the circle and the triangle are provided for explanation and are not actually present. The first edge may be parallel to the main scanning direction. Therefore, detection accuracy for the length Y1 of the first edge may be higher than detection accuracy for the length X1 of the second edge. With reference to FIG. 10, the first edge of a sheet image 313 comprised in the second image data 311 may be indicated with the circle. Note that the circle and the square are provided for explanation and are not actually present. The first edge may be parallel to the sub-scanning direction. Therefore, detection accuracy for the length Y2 of the first edge may be higher than detection accuracy for the length X2 of the second edge.

The adjustment value determiner 57 determines an adjustment value using the length Y1 of the first edge of the sheet image 313 comprised in the first image data 301 with the circle and the length Y2 of the first edge of the sheet image 303 comprised in the second image data 311 with the circle. Because using the length of the same edge corresponding to the single edge of a document among the four edges of the sheet image comprised in each of the first image data and the second image data, the adjustment value determiner 57 can accurately determine an adjustment value. The edges of the document opposite to each other may have different lengths due to a manufacturing error. Because the first measurement value and the second measurement value are determined with reference to one edge of document, the accuracy of an adjustment value can be increased.

The first edge of the sheet image 303 comprised in the first image data 301 illustrated in FIG. 9 may be the edge with the circle. In this case, the first edge of the sheet image 313 comprised in the second image data 311 illustrated in FIG. 10 is the edge with the square.

The adjustment value determiner 57 determines an adjustment value using the first measurement value Y1 determined by the first detector 71 and the second measurement value Y2 determined by the second detector 73. Specifically, the adjustment value determiner 57 determines the adjustment value a using the following formula (1). The adjustment value determiner 57 outputs the determined adjustment value a to the associator 65. $Y2=Y1\times\alpha$ . . . (1) The adjustment value a may be used for adjustment of the length of image data in the sub-scanning direction. The length in the sub-scanning direction of the image data output by the document reading section 130 may be multiplied by the adjustment value a. For example, in a case in which the length in the sub-scanning direction is indicated by the number of pixels per inch, the number of pixels may be changed based on the adjustment value a.

The type acquirer 61 acquires the type of a document, and outputs the acquired type to the associator 65 and the setter 67. In a case in which the automatic document conveyance apparatus 120 may comprise a sensor that detects the type of a document to be conveyed, the type detected by the sensor may be acquired in a period during which the document may be conveyed. Further, in a case in which the user inputs the type of a document to the operation part 163, the type input by the user may be acquired.

The size acquirer 63 acquires the size of a document and outputs the acquired size to the associator 65 and the setter 67. The size acquirer 63 acquires the size of a document based on first image data and second image data.

The associator 65 receives an adjustment value a from the adjustment value determiner 57, receives the type of a test document from the type acquirer 61, and receives the size of the test document from the size acquirer 63. The associator 65 associates the adjustment value a with the type and the size. Specifically, the associator 65 adds a record in which the adjustment value a may be associated with the type and the size to a table stored in the HDD 115.

The setter 67 receives the type of a document from the type acquirer 61 and receives the size of a document from the size acquirer 63. With reference to the table stored in the HDD 115, the setter 67 acquires the adjustment value a associated with the size and the type, and sets the acquired adjustment value a. Thus, the length in the sub-scanning direction of the image data subsequently output by the document reading section 130 may be adjusted using the adjustment value a.

Figure 11:
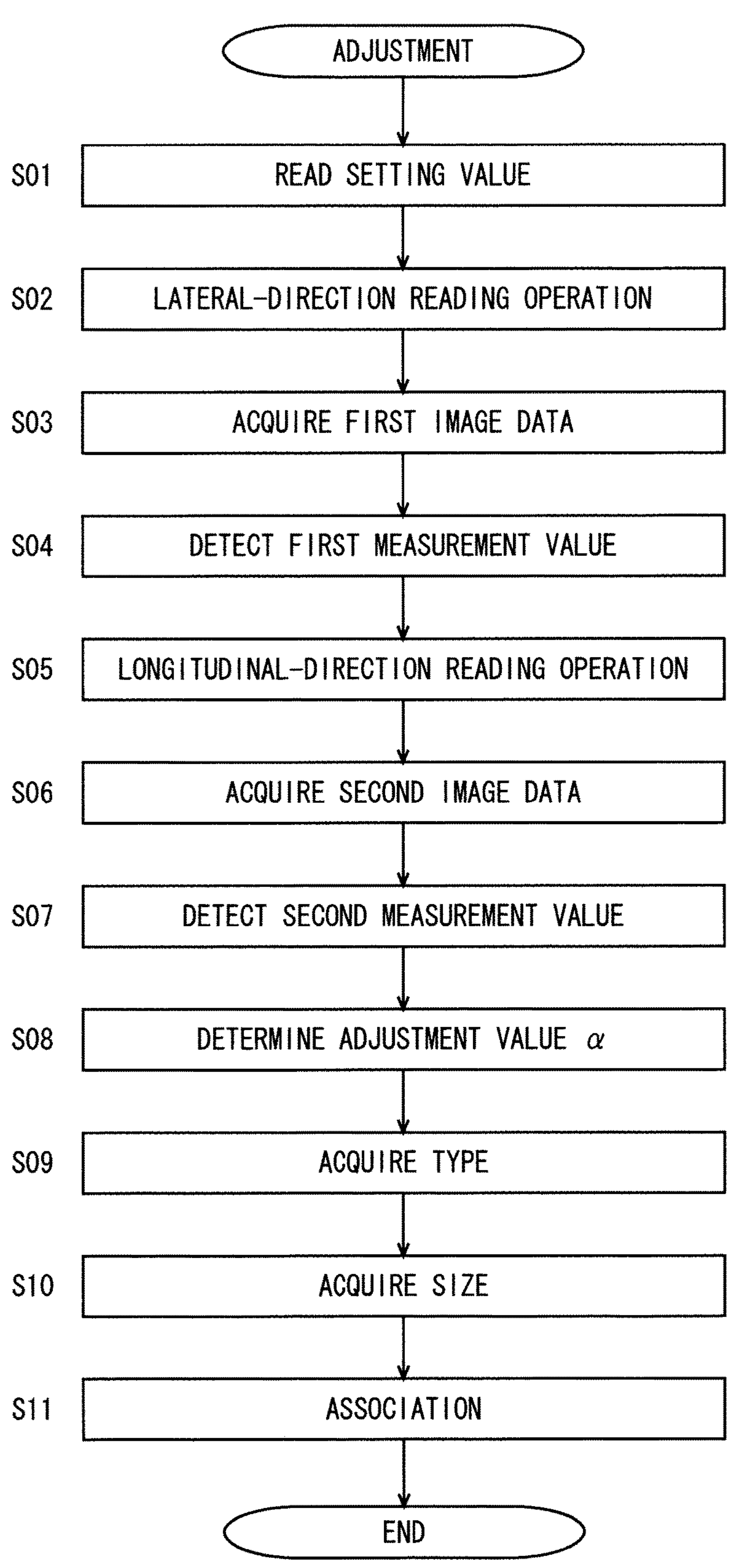
FIG. 11 is a flowchart illustrating one example of a flow of an adjustment process.

FIG. 11 is a flowchart illustrating one example of a flow of an adjustment process. The adjustment process may be a process executed by the CPU 111 comprised in the MFP 100 when the CPU 111 executes the adjustment program stored in the ROM 113, the RAM 114, the HDD 115 or the CD-ROM 118A. With reference to FIG. 11, the CPU 111 reads a setting value (step S01), and the process proceeds to the step S02. The setting value may be a value that may be set for determination of the length in the sub-scanning direction of image data output by the document reading section 130. The setting value may be a value that has been adjusted using an adjustment value a, described below, before the adjustment process may be executed.

In the step S02, the lateral-direction reading operation of reading a test document may be performed, and the process proceeds to the step S03. The first guide screen illustrated in FIG. 7 may be displayed on the display part 161, the user sets the test document in the automatic document conveyance apparatus 120, and then the test document may be read by the document reading section 130.

In the step S03, first image data output by the document reading section 130 may be acquired by execution of the lateral-direction reading operation, and the process proceeds to the step S04. In the step S04, a first measurement value may be detected, and the process proceeds to the step S05. As illustrated in FIG. 9, the sheet image 303 may be extracted from the first image data 301, and the length Y1 of the first edge parallel to the main scanning direction among the four edges of the sheet image 303 may be detected as the first measurement value. In the first image data 301, a plurality of pixels that are continuously arranged in the main scanning direction and differ in brightness from adjacent pixels in the sub-scanning direction, and a plurality of pixels that are continuously arranged in the sub-scanning direction and differ in brightness from adjacent pixels in the main-scanning direction, are extracted as the outline of the sheet image 303.

In the step S05, the longitudinal-direction reading operation of the test document may be performed, and the process proceeds to the step S06. The second guide screen illustrated in FIG. 8 may be displayed on the display part 161, the user sets the test document in the automatic document conveyance apparatus 120, and then the test document may be read by the document reading section 130.

In the step S06, the second image data output by the document reading section 130 may be acquired by execution of the longitudinal-direction reading operation, and the process proceeds to the step S07. In the step S07, a second measurement value may be detected, and the process proceeds to the step S08. As illustrated in FIG. 10, the sheet image 313 may be extracted from the second image data 311, and the length Y2 of the first edge parallel to the sub-scanning direction among the four edges of the sheet image 313 may be detected as the second measurement value.

In the step S08, the adjustment value a may be determined using the above-mentioned formula (1) above, and the process proceeds to the step S09. In the step S09, the type of the test document may be acquired, and the process proceeds to the step S10. In the step S10, the size of the test document may be acquired, and the process proceeds to the step S11. In the step S11, the adjustment value a determined in the step S08, the type acquired in the step S09, and the size acquired in the step S10 are associated with one another, and the process ends. A record comprising the adjustment value a, the type and the size may be generated and added to the table stored in the HDD 115.

The adjustment value a may be used to adjust the length in the sub-scanning direction of the image data output by the document reading section 130 when the document reading section 130 reads a document next time. Specifically, the length in the sub-scanning direction of the image data output by the document reading section 130 may be changed using the adjustment value a associated with the type and the size of the document.

Second Embodiment

In the first embodiment, the length in the sub-scanning direction of image data output by the document reading section 130 may be adjusted. In a second embodiment, the length of image data output by each of the first CIS 206 and the second CIS 207 in the sub-scanning direction may be adjusted. The differences from the first embodiment will be mainly described below.

In the first embodiment, a subject to be read by the document reading section 130 may be a document. In contrast, in the second embodiment, the first CIS 206 and the second CIS 207 of the inspection apparatus 200 read a sheet on which an image may be formed by the MFP 100.

With reference to FIG. 6, the reading controller 51 controls each of the first CIS 206 and the second CIS 207, and acquires the image data output by each of the first CIS 206 and the second CIS 207. The first CIS 206 and the second CIS 207 have the same function although reading different sides of a sheet. Therefore, the first CIS 206 will be described as an example.

Each of the first image data acquirer 53 and the second image data acquirer 55 acquires image data pieces output by the first CIS 206 that reads a sheet of the same type and the same size in different directions. Here, in a case in which an X direction and a Y direction that are orthogonal to each other are defined, among four edges that form the outline of a sheet, the length of a first edge parallel to the Y direction may be YL, and the length of a second edge parallel to the X direction may be XL. Further, YL>YX. Here, an operation of reading a sheet having the second edge (X direction) parallel to the sub-scanning direction by the first CIS 206 may be referred to as a lateral-direction reading operation, and an operation of reading a sheet having the first edge (Y direction) parallel to the sub-scanning direction may be referred to as a longitudinal-direction reading operation. The first edge and the second edge are not necessarily orthogonal to each other due to a manufacturing error of the sheet. Here, an angle at which the X direction and the Y direction intersect with each other indicates an angle at which the first edge and the second edge intersect with each other, and may comprise a manufacturing error.

Since the first CIS 206 reads the sheet conveyed through the conveyance path R, the conveyance direction may be parallel to the sub-scanning direction. The sheet may not be necessarily conveyed with the first edge (Y direction) or the second edge (X direction) of the sheet being in parallel with the sub-scanning direction. In this case, in the lateral-direction reading operation, an angle at which the first edge (Y direction) of the sheet and the main scanning direction intersect with each other may be smaller than an angle at which the second edge (X direction) and the main scanning direction intersect with each other. Similarly, in the longitudinal-direction reading operation, an angle at which the second edge (X direction) of the sheet intersects with the main scanning direction may be smaller than an angle at which the first edge (Y direction) intersects with the main scanning direction.

One of the first image data acquirer 53 and the second image data acquirer 55 causes the first CIS 206 to perform the longitudinal-direction reading operation, and the other one of the first image data acquirer 53 and the second image data acquirer 55 causes the first CIS 206 to perform the lateral-direction reading operation. Here, the first image data acquirer 53 causes the first CIS 206 to perform the longitudinal-direction reading operation, and the second image data acquirer 55 causes the first CIS 206 to perform the lateral-direction reading operation, by way of example. Further, sheets of the same size and the same type are contained in the sheet feed cassette 35 and the sheet feed cassette 35A, by way of example. The sheet feed cassette 35 contains sheets such that the second edge may be parallel to the conveyance direction, and the sheet feed cassette 35A contains sheets such that the first edge may be parallel to the conveyance direction. In other words, a sheet supplied from the sheet feed cassette 35 may be conveyed such that the second edge (X direction) may be parallel to the conveyance direction (sub-scanning direction), and a sheet supplied from the sheet feed cassette 35A may be conveyed such that the first edge (Y direction) may be parallel to the conveyance direction (sub-scanning direction).

In a case in which a sheet supplied from the sheet feed cassette 35 may be conveyed, the first image data acquirer 53 instructs the inspection apparatus 200 to perform a reading operation. When being instructed to perform the reading operation, the inspection apparatus 200 causes the first CIS 206 to read the sheet, acquires image data output by the first CIS 206, and outputs the image data to the first image data acquirer 53. The first image data acquirer 53 outputs the image data received from the inspection apparatus 200 to the adjustment value determiner 57 as first image data.

In a case in which a sheet supplied from the sheet feed cassette 35A may be conveyed, the second image data acquirer 55 instructs the inspection apparatus 200 to perform a reading operation. When being instructed to perform the reading operation, the inspection apparatus 200 causes the first CIS 206 to read the sheet, acquires image data output by the first CIS 206, and outputs the image data to the second image data acquirer 55. The second image data acquirer 55 outputs the image data received from the inspection apparatus 200 to the adjustment value determiner 57 as second image data.

The adjustment value determiner 57 may comprise the first detector 71 and the second detector 73. The first detector 71 receives first image data from the first image data acquirer 53. The first detector 71 extracts a sheet image from the first image data, detects the length Y1 of the first edge of the sheet image, and determines the detected length Y1 of the first edge as a first measurement value.

The second detector 73 receives second image data from the second image data acquirer 55. The second detector 73 extracts a sheet image from the second image data, detects the length Y2 of the first edge of the sheet image, and determines the detected length Y2 of the first edge as a second measurement value.

The adjustment value determiner 57 determines an adjustment value using the first measurement value Y1 determined by the first detector 71 and the second measurement value Y2 determined by the second detector 73. Specifically, the adjustment value determiner 57 determines the adjustment value a using the above-mentioned formula (1). The adjustment value determiner 57 outputs the determined adjustment value a to the associator 65.

The adjustment value a may be used to adjust the length in the sub-scanning direction of the image outputted by the first CIS 206. The length in the sub-scanning direction of the image data output by the first CIS 206 may be multiplied by the adjustment value a. For example, in a case in which the length in the sub-scanning direction may be indicated by the number of pixels per inch, the number of pixels may be changed based on the adjustment value a.

The type acquirer 61 acquires the type of a sheet and outputs the acquired type to the associator 65 and the setter 67. The type acquirer 61 acquires the type detected by the type detection sensor 39.

The size acquirer 63 acquires the size of the sheet and outputs the acquired size to the associator 65 and the setter 67. The sheet feed cassettes 35, 35A, 35B are associated with the sizes of sheets to be contained therein. The size acquirer 63 acquires the sizes associated with the sheet feed cassettes 35, 35A.

The associator 65 receives the adjustment value a from the adjustment value determiner 57, the type of the sheet from the type acquirer 61, and the type of the sheet from the size acquirer 63. The associator 65 associates the adjustment value a with the type and the size. Specifically, the associator 65 adds a record in which the adjustment value a may be associated with the type and the size to a table stored in the HDD 115.

The setter 67 receives the type of the sheet from the type acquirer 61 and receives the size of the sheet from the size acquirer 63. With reference to the table stored in the HDD 115, the setter 67 acquires the adjustment value a associated with the size and the type, and sets the acquired adjustment value a. Thus, the length in the sub-scanning-direction of the image data subsequently output by the first CIS 206 may be adjusted using the adjustment value a.

Modification Examples (1) While the length in the sub-scanning direction of the image data may be adjusted using an adjustment value a, the present invention may not be limited to this. A conveyance speed at which a document or a sheet is conveyed may be adjusted using an adjustment value a. Further, the intervals at which the CCD sensor 18, the first CIS 206 or the second CIS 207 scans a sheet in the main scanning direction may be adjusted using the adjustment value a.

(2) A first measurement value and a second measurement value are not limited to the length Y1 of the first edge of a sheet comprised in first image data and the length Y2 of the first edge of a sheet comprised in second image data. The first measurement value may be the length X1 of the second edge of the sheet comprised in the first image data, and the second measurement value may be the length X2 of the second edge of the sheet comprised in the second image data. Also in this case, the accuracy for adjusting an error of the length in the sub-scanning direction may be sufficient.

(3) Further, in a case in which an error of the length in the X direction and the length in the Y direction of a document are within a predetermined range, it may not be necessary to provide marks indicating the front side and the back side, and the direction on the document. When a document is not a square but a rectangle, the orientation of the document can be identified based on the relative positions of the longer edge and the shorter edge with respect to the main scanning direction.

(4) While being associated with the type and the size of a test image or a sheet by way of example, an adjustment value a may be associated with the type of a test image or a sheet but not associated with the size of a test image or a sheet. Further, an adjustment value a does not have to be associated with the type of a test image or a sheet, and may be associated with the size of a test image or a sheet.

As described above, the image forming system 1 may comprise the CCD sensor 18 in which the plurality of optoelectronic transducers are aligned in the main scanning direction, the slider 12 that causes the CCD sensor 18 to scan a document in the sub-scanning direction orthogonal to the main scanning direction, the first CIS 206 and the second CIS 207 in which the plurality of optoelectronic transducers are aligned in the main scanning direction, and the pair of first conveyance rollers 211 and the pair of second conveyance rollers 212 that cause the first CIS 206 and the second CIS 207 to scan a sheet in the sub-scanning direction.

An adjustment value a for defining the length in the sub-scanning direction of image data may be determined based on first image data output by the CCD sensor 18, the first CIS 206 or the second CIS 207 when the lateral-direction reading operation is performed and second image data output by the CCD sensor 18, the first CIS 206 or the second CIS 207 when the longitudinal-direction reading operation is performed. Because the plurality of optoelectronic transducers are aligned in the main scanning direction, the detection accuracy of the length in the main scanning direction of each of the first image data and the second image data may be higher than the detection accuracy of the length in the sub-scanning direction of each of the first image data and the second image data. In regard to the image of a first sheet comprised in the first image data, an angle at which the first edge intersects with the main scanning direction may be smaller than an angle at which the second edge intersects with the main scanning direction. In regard to the image of a second sheet comprised in the second image data, an angle at which the second edge intersects with the main scanning direction may be smaller than an angle at which the first edge intersects with the main scanning direction. Therefore, in regard to the image of the first sheet comprised in the first image data, the detection accuracy of the length of the first edge may be higher than the detection accuracy of the length of the second edge. In regard to the image of the second sheet comprised in the second image data, the detection accuracy of the length of the second edge may be higher than the detection accuracy of the length of the first edge. The first sheet and the second sheet have the same size. Therefore, it may be possible to determine an adjustment value a that defines the length in the sub-scanning direction of the second image data based on a set of the length of the first edge of the image of the first sheet comprised in the first image data and the length of the first edge of the image of the second sheet comprised in the second image data. Further, it may be possible to determine an adjustment value a that defines the length in the sub-scanning direction of the first image data based on a set of the length of the second edge of the image of the first sheet comprised in the first image data and the length of the second edge of the image of the second sheet comprised in the second image data. As a result, it may be possible to easily adjust the size of the image data obtained when a sheet may be read.

Further, the first edge may be longer than the second edge. A first measurement value obtained when the length Y1 of the first edge of the image of the first sheet comprised in the first image data is measured may be detected. A second measurement value obtained when the length Y2 of the second edge of the image of the second sheet comprised in the second image data may be detected. A adjustment value a may be determined using the formula (1), the first measurement value and the second measurement value. In the image of the first sheet comprised in the first image data, the first edge having a length with high detection accuracy may be longer than the second edge. In the image of the second sheet comprised in the second image data, the second edge having a length with high detection accuracy may be shorter than the first edge. Therefore, an adjustment value a that defines the length, determined based on the first edge of the first sheet comprised in the first image data, in the sub-scanning direction of the second image data can have higher accuracy than an adjustment value that defines the length, determined based on the second edge of the second sheet comprised in the second image data, in the sub-scanning direction of the first image data.

Further, marks for identifying the front side and the back side, and one direction are provided on both sides of a test document. Therefore, the same edge can be extracted from each of the first image data and the second image data.

In the first embodiment, the first image data and the second image data are acquired by using one test image. Therefore, an adjustment value a may be determined based on the length of the same edge of the same test image based on the first image data and the second image data, so that it may be possible to accurately adjust the length in the sub-scanning direction.

Further, because the type of a test document or a sheet may be associated with an adjustment value a, the adjustment value may be different depending on the type of the document or sheet. Therefore, the adjustment value a can also be used in a case in which a factor that influences scanning in the sub-scanning direction varies depending on the type of a document or a sheet.

Further, because the size of a test document or a sheet and an adjustment value a are associated with each other, it may be possible to change the adjustment value according to the size of a document or a sheet. Therefore, the adjustment value a can also be used in a case in which a factor that influences scanning in the sub-scanning direction varies depending on the size of a document or a sheet.

Although embodiments of the present invention have been described and illustrated in detail, the disclosed embodiments are made for purpose of illustration and example only and not limitation. The scope of the present invention should be interpreted by terms of the appended claims.

What is claimed is:

1. An image reading device comprising:

a reading section having a plurality of optoelectronic transducers aligned in a main scanning direction;

a sub-scanner that causes the reading section to scan a first sheet and a second sheet in a sub-scanning direction orthogonal to the main scanning direction, the first sheet and the second sheet respectively having a first edge and a second edge that intersect with each other and having a same size, and a controller, the controller determining an adjustment value that defines a length in the sub-scanning direction of image data output by the reading section based on first image data and second image data, the first image data being output by the reading section that scans the first sheet in a state in which an angle at which the first edge intersects with the main scanning direction is smaller than an angle at which the second edge intersects with the main scanning direction, the second image data being output by the reading section that scans the second sheet in a state in which an angle at which the second edge intersects with the main scanning direction is smaller than an angle at which the first edge intersects with the main scanning direction.

2. The image reading device according to claim 1, wherein the first edge is longer than the second edge, and the image reading device further includes a first detector that detects a first measurement value obtained when a length of the first edge in an image of the first sheet included in the first image data is measured, and a second detector that detects a second measurement value obtained when a length of the first edge in an image of the second sheet included in the second image data is measured, and the controller determines the adjustment value using the first measurement value and the second measurement value.

3. The image reading device according to claim 1, wherein marks for identifying a front side, a back side and one direction are provided in each of the first sheet and the second sheet.

4. The image reading device according to claim 1, wherein the reading section is a contact image sensor.

5. The image reading device according to claim 1, wherein the first sheet and the second sheet are same.

6. The image reading device according to claim 1, wherein the controller associates the adjustment value with a type of the first sheet or the second sheet, and acquires a type of sheet, and sets the adjustment value associated with the acquired type.

7. The image reading device according to claim 1, wherein the controller associates the adjustment value with a size of the first sheet or the second sheet, and acquires a size of sheet, and sets the adjustment value associated with the acquired size.

8. An adjustment method that is performed in an image reading device including a reading section having a plurality of optoelectronic transducers aligned in a main scanning direction, including:

a sub-scanning step of causing the reading section to scan a first sheet and a second sheet in a sub-scanning direction orthogonal to the main scanning direction, the first sheet and the second sheet respectively having a first edge and a second edge that intersect with each other and having a same size, and a determining step of determining an adjustment value that defines a length in the sub-scanning direction of image data output by the reading section based on first image data and second image data, the first image data being output by the reading section that scans the first sheet in a state in which an angle at which the first edge intersects with the main scanning direction is smaller than an angle at which the second edge intersects with the main scanning direction, the second image data being output by the reading section that scans the second sheet in a state in which an angle at which the second edge intersects with the main scanning direction is smaller than an angle at which the first edge intersects with the main scanning direction.

9. The adjustment method according to claim 8, wherein the first edge is longer than the second edge, and the adjustment method further includes a first detecting step of detecting a first measurement value obtained when a length of the first edge in an image of the second sheet included in the first image data is measured, and a second detecting step of detecting a second measurement value obtained when a length of the first edge in an image of the second sheet included in the second image data is measured, and the determining step includes determining the adjustment value using the first measurement value and the second measurement value.

10. The adjustment method according to claim 8, wherein marks for identifying a front side, a back side and one direction are provided in each of the first sheet and the second sheet.

11. The adjustment method according to claim 8, wherein the reading section is a contact image sensor.

12. The adjustment method according to claim 8, wherein the first sheet and the second sheet are same.

13. The adjustment method according to claim 8, further including:

an associating step of associating the adjustment value with a type of the first sheet or the second sheet; and a type acquiring step of acquiring a type of sheet; and a setting step of setting the adjustment value associated with the type acquired in the type acquiring step.

14. The adjustment method according to claim 8, further including:

a size associating step of associating the adjustment value with a size of the first sheet or the second sheet;

a size acquiring step of acquiring a size of sheet; and a setting step of setting the adjustment value associated with the size acquired in the size acquiring step.

15. A non-transitory computer-readable recording medium encoded with an adjustment program executed in a computer that controls an image reading device including a reading section having a plurality of optoelectronic transducers aligned in a main scanning direction, the adjustment program causing the computer to execute:

a sub-scanning step of causing the reading section to scan a first sheet and a second sheet in a sub-scanning direction orthogonal to the main scanning direction, the first sheet and the second sheet respectively having a first edge and a second edge that intersect with each other and having a same size; and a determining step of determining an adjustment value that defines a length in the sub-scanning direction of image data output by the reading section based on first image data and second image data, the first image data being output by the reading section that scans the first sheet in a state in which an angle at which the first edge intersects with the main scanning direction is smaller than an angle at which the second edge intersects with the main scanning direction, the second image data being output by the reading section that scans the second sheet in a state in which an angle at which the second edge intersects with the main scanning direction is smaller than an angle at which the first edge intersects with the main scanning direction.

* * * * *